(12) United States Patent
Rodríguez

(10) Patent No.: US 12,504,197 B2
(45) Date of Patent: Dec. 23, 2025

(54) DUCT ALIGNMENT AND SECUREMENT SYSTEM

(71) Applicant: Hiram Rodríguez, Saint Cloud, FL (US)

(72) Inventor: Hiram Rodríguez, Saint Cloud, FL (US)

( * ) Notice: Subject to any disclaimer, the term of this patent is extended or adjusted under 35 U.S.C. 154(b) by 355 days.

(21) Appl. No.: 18/207,265

(22) Filed: Jun. 8, 2023

(65) Prior Publication Data

US 2024/0410610 A1   Dec. 12, 2024

(51) Int. Cl.
*F24F 13/02*   (2006.01)

(52) U.S. Cl.
CPC .............................. *F24F 13/0209* (2013.01)

(58) Field of Classification Search
CPC ...... F24F 13/0209; B23Q 3/186; B23P 19/00; Y10T 29/49826; Y10T 29/53678; Y10T 29/53709; Y10T 29/53909
See application file for complete search history.

(56) References Cited

U.S. PATENT DOCUMENTS 5,594,982 A * 1/1997 Dobbeck ................. F16B 5/004
29/270

* cited by examiner

*Primary Examiner* — Jason L Vaughan
*Assistant Examiner* — Amanda Kreiling
(74) *Attorney, Agent, or Firm* — Jason T. Daniel, Esq.; Daniel Law Offices, P.A.

(57) ABSTRACT

A duct alignment and securement system includes a guide device having a first alignment channel for engaging a pair of flanges on adjacent air conditioning ducts. Stop tabs extend outward on the top end of the guide body and are separated by a distance that is greater than the width of a drive cleat. A drive cleat tool has a main body, a second alignment channel and a reciprocating saw connector. The width of the tool body is less than the opening on one end of the drive cleat, and two engagement tabs extend outward from the tool body with widths that are greater than the opening on the drive cleat. The reciprocating saw moves the tool such that the engagement tabs strike the top end of the drive cleat to push the cleat along the length of the flanges that are aligned by the guide device.

20 Claims, 8 Drawing Sheets

DUCT ALIGNMENT AND SECUREMENT SYSTEM

TECHNICAL FIELD

The present invention relates generally to commercial HVAC systems, and more particularly to a system for aligning and securing ducts together.

BACKGROUND

The statements in this section merely provide background information related to the present disclosure and may not constitute prior art.

Commercial HVAC systems typically utilize elongated rigid rectangular-shaped ducts that are joined together along distal ends to form the air distribution channels of a building. The current practice for joining adjacent ducts together is a laborious and tedious process that requires an installer to align the flanges located on two walls of each duct together, and to then slide a drive cleat (also referred to as an S-cleat) along the length of the aligned flanges to secure the walls together.

Although simple in theory, real world experience shows that it is exceedingly difficult to get the flanges of two ducts to align and remain aligned while attempting to install the drive cleat. In this regard, the process often takes two workers wherein one worker attempts to hold the ducts together, and the other worker attempts to align and slide the drive cleat along the flanges. Moreover, even when the drive cleat is able to begin engaging the ends of the flanges, it will not slide easily. As such, installers must often use a hammer or mallet to strike the end of the drive cleat in order to move it along the length of the flanges. This manual process often causes damage to the drive cleat itself and/or the ducts, due to the malleable nature of the thin aluminum used in their construction.

Accordingly, it would be beneficial to provide a system for aligning and securing ducts together so as to overcome the drawbacks described above.

SUMMARY OF THE INVENTION

The present invention is directed to a duct alignment and securement system. One embodiment of the present invention can include a flange guide device having a generally A-shaped main body. A first alignment channel can be formed along the flange guide main body. The first alignment channel can function to engage a pair of flanges on adjacent air conditioning ducts and can include a closed top end, an open bottom end, and tapered side walls. A pair of stop tabs can be positioned along the top end of the guide body and can include a separation distance that is greater than the width of a drive cleat.

One embodiment of the present invention can also include a drive cleat tool having a main body with a second alignment channel. The second alignment channel can include complementary dimensions to the upper half of the first alignment channel for also engaging the flanges of adjacent air conditioning ducts. A power tool engagement member can be positioned along the top end of the tool and can engage a reciprocating saw, and a pair of engagement tabs can extend outward from the tool body.

The reciprocating saw can move the tool such that the engagement tabs strike the top end of the drive cleat to push the cleat along the length of the flanges that are aligned by the guide device.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
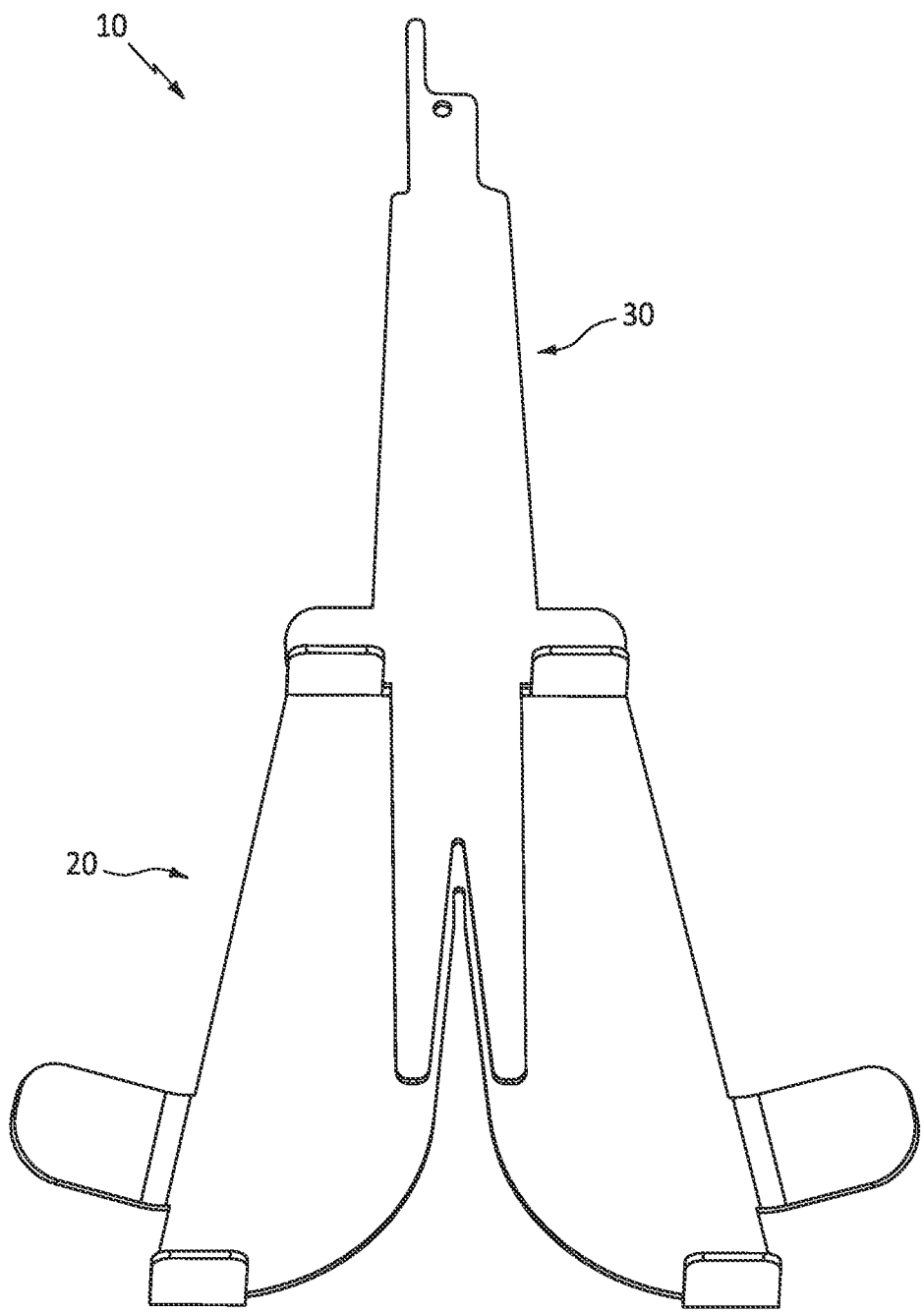
FIG. 1 is a front view of a duct alignment and securement system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

DEFINITIONS

As described herein, a "unit" means a series of identified physical components which are linked together and/or function together to perform a specified function.

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples of connectors include, but are not limited to, flexible strips of interlocking projections with a slider (i.e., zipper), thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-4E illustrate one embodiment of a duct alignment and securement system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one embodiment of the system components. As shown, the system 10 can include a duct flange guide device 20 and a drive cleat securement tool 30.

Figure 2:
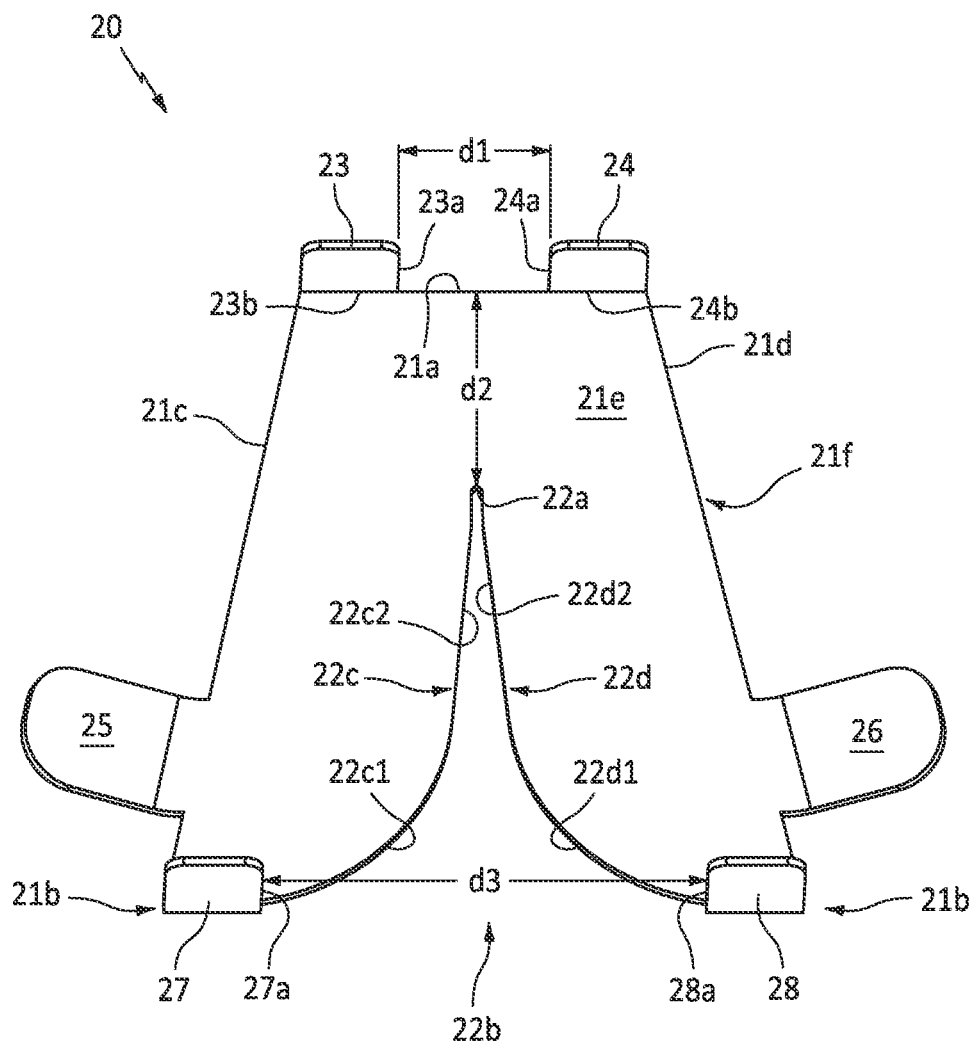
FIG. 2 is a front view of the guide device of the duct alignment and securement system in accordance with one embodiment of the invention.

As shown best at FIG. 2, the guide device 20 can include a generally planar body section having a top end 21a, a bottom end 21b, a pair of sides 21c and 21d, a front surface 21e and a back surface 21f. In the preferred embodiment, the main body can include a generally A-shaped member wherein sides 21c and 21d extend outward diagonally from the top end 21a toward the bottom end 21b.

In one embodiment, a first alignment channel is formed along the main body and includes a closed top end 22a, an open bottom end 22b, and a pair of opposing side walls 22c and 22d that extend from the open bottom open end to the closed top end. As shown, the bottom half of the side walls include curved corners 22c1 and 22d1 that extend away from each other until terminating along the sides of the main body 21c and 22d, and the upper half of the side walls 22c2 and 22d2 are aligned generally parallel and gradually narrow until reaching the top end 22a.

In one embodiment, a pair of tool stop tabs 23 and 24 can be positioned along the top end of the main body 21a. Each of the stop tabs can include protrusions that project perpendicularly from the front surface 21e. In the preferred embodiment, the stop tabs can be positioned such that inside edges 23a and 24a include a separation distance d1 from each other that is complementary to or greater than the width of an industry standard drive cleat such as 3 cm, for example. Likewise, it is preferred that the bottom edges 23b and 24b of the stop tabs include a separation distance d2 from the closed top end of the guide channel 22a of about 3 cm. Of course, other shapes and sizes are also contemplated.

In one embodiment, a first pair of handle sections 25 and 26 can be positioned along the main body. In the preferred embodiment, the first pair of handle sections 25 and 26 can include protrusions that project outward acutely from both the front surface 21e and the side surfaces 22c and 22d (diagonally across two dimensions). As will be described below, the first pair of handle sections are designed to allow a user to easily move the back surface of the main body 21f toward and away from the AC ducts when aligning the flanges within the guide channel.

In one embodiment, a second pair of handle sections 27 and 28 can be positioned along the bottom end of the main body 21b. In the preferred embodiment, the second pair of handle sections 27 and 28 can include protrusions that project perpendicularly from the front surface 21e so as to be generally parallel with the stop tabs 23 and 24, respectively. The inside edges 27a and 28a can include a separation distance d3 that is greater than the separation distance d1 of the stop tabs so as to not interfere with the operation of the securement tool 30, and the outside edges of the second pair of handle sections are preferably located against the sides 21c and 21d of the main body.

As will be described below, the second pair of handle sections 27 and 28 are designed to be grasped by an installer in a manner that permits them to push and slide the device along the length of the AC ducts once the back surface is in contact with the ducts. As such, both sets of handles will preferably include the illustrated rounded corners to prevent cutting the hands of the installer. Of course, other shapes and angles are also contemplated.

The guide device 20 will preferably be constructed from a single piece of metal such as aluminum or steel, for example, that is capable of withstanding the rigors of repeated impacts by the drive cleat securement tool 30, as described below. Of course, other construction materials are also contemplated.

Figure 3:
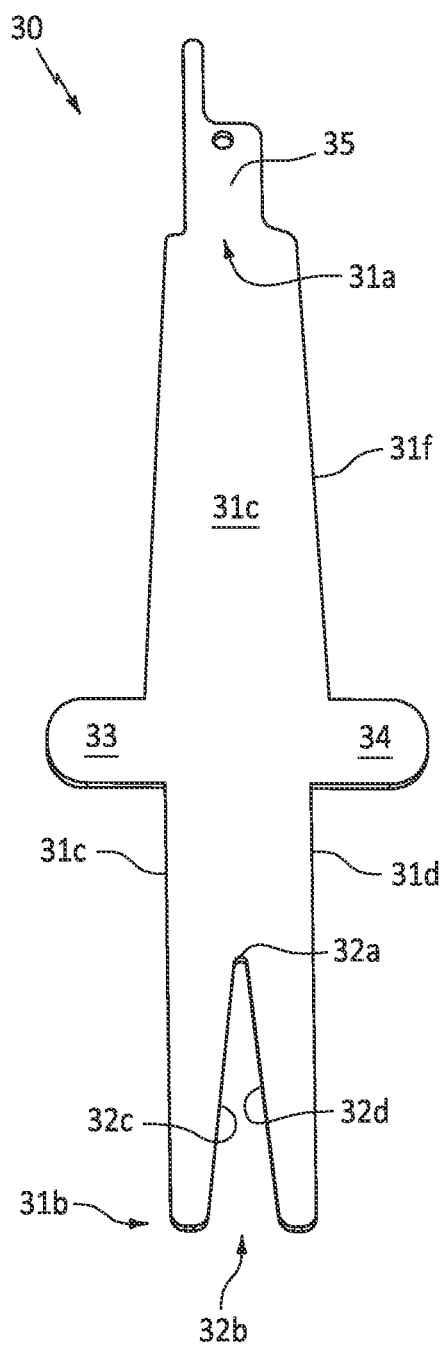
FIG. 3 is a front view of the drive cleat securement tool of the duct alignment and securement system in accordance with one embodiment of the invention.

FIG. 3 illustrates one embodiment of a drive cleat tool 30 for use with the above noted guide device 20. As shown, the tool 30 can include a main body having a top end 31a, a bottom end 31b, a pair of sides 31c and 31d, a front surface 31e, and a back surface 31f.

In the preferred embodiment, the tool body can include a width (e.g., distance between side walls 31c and 31d) that is less than the separation distance d1 of the guide 20, and that is also less than or complementary to the width of an opening along one end of a commercially available drive cleat-typically about 2 cm, for example. Likewise, the tool can include a thickness (e.g., distance between the front surface 31e and the back surface 31f) that is complementary to or less than the thickness of the opening along one end of the commercially available drive cleat-typically about 1 cm, for example. Such dimensions being specifically chosen for permitting the bottom half of the tool 30 to be removably positioned within one end of a drive cleat, as will be described below.

In one embodiment, a second alignment channel is formed along the main body of the tool 30. The second alignment channel can include a closed top end 32a, an open bottom end 32b, and a pair of opposing side walls 32c and 32d. Additionally, a pair of engagement tabs 33 and 34 can extend outward from the sides 31c and 31d of the tool body, respectively. The engagement tabs can extend outward at a distance greater than d1 but less than d3.

In the preferred embodiment, the side walls 32c and 32d can include a shape, orientation and dimension that is complementary to the shape, orientation, and dimension of the upper half of the side walls 22c2 and 22d2 of the alignment channel on the device 20. Likewise, the bottom edge 33a and 33b of the engagement tabs can be located the same distance d2 from the top end of the small alignment channel 32a (See FIG. 1).

As will be described below, such dimensions are important because they allow the alignment channel of the device 20 to initially engage and align the top ends of the flanges of two adjoining air conditioning ducts and to align the flanges such that they can be subsequently engaged by the second alignment channel on the tool 30 without having to reposition the guide, the ducts or the flanges.

In one embodiment, a power tool engagement member 35 extends outward from the top end 31a of the tool. In the preferred embodiment, the power tool engagement member can include a universal shape and a sized protrusion for engagement by the blade clamp assembly of any commercially available reciprocating saw. Of course, other embodiments are contemplated wherein the tool engagement member includes a different shape or sized protrusion and/or wherein any number of connectors are provided to allow the tool to engage a different type of power tool.

FIGS. 4A-4E illustrate one embodiment of the system 10 in operation. As shown, a user can first manually align two air conditioning ducts 1 and 2 together with the flanges 1a and 2a adjacent to each other. Next, the installer can use the first or second set of handles on the guide 20 to position the back surface of the guide body against the ducts and can then align the top ends of the flanges 1a and 2a with the alignment channel opening 22b. Next, the installer can push the guide down (see arrow A) whereby the curved walls 22c1 and 22d1 can engage and push the flanges together until the top ends of the flanges are located between the upper half of the side walls 22c2 and 22d2.

Figure 4A:
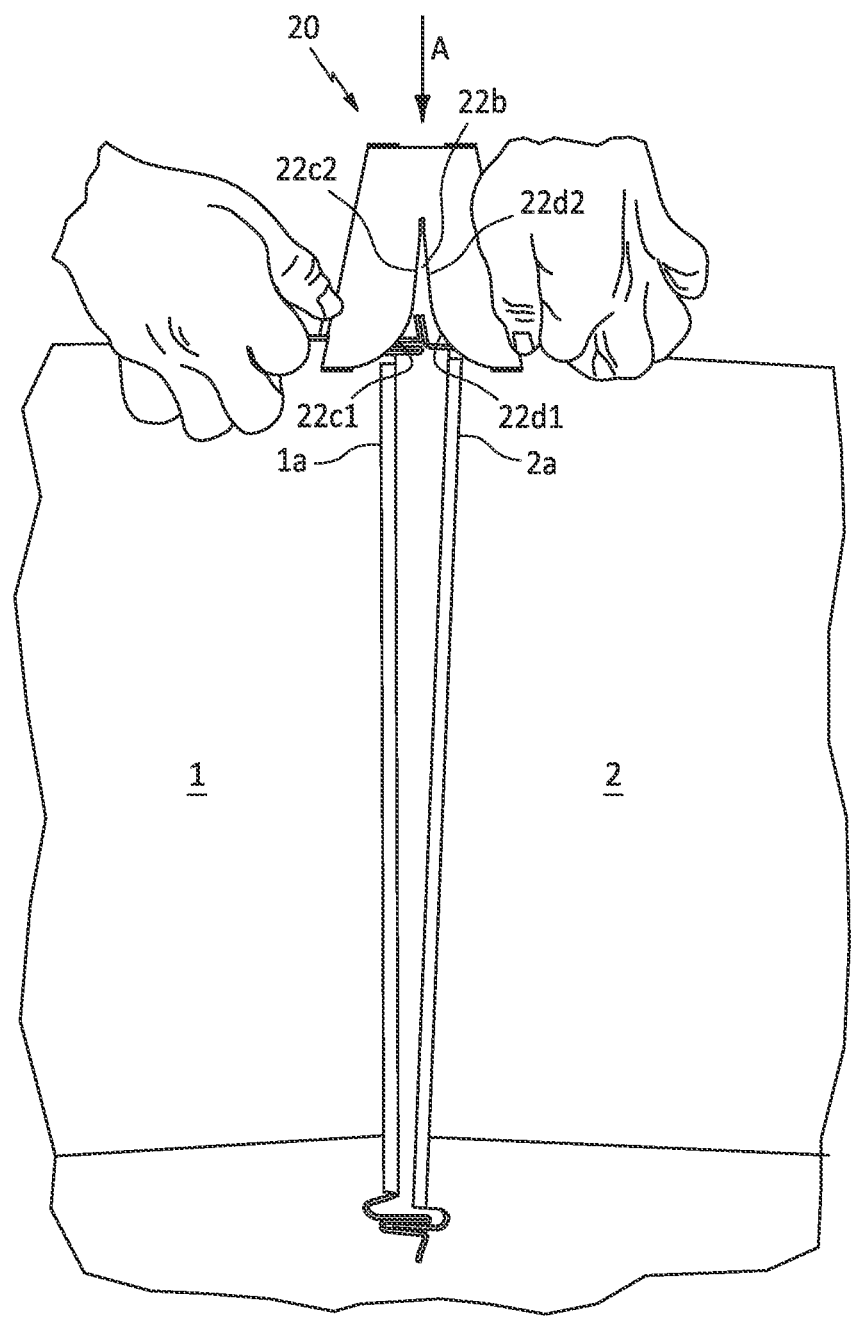
FIG. 4A a front view of the duct alignment and securement system in operation, in accordance with one embodiment of the invention.
Figure 4B:
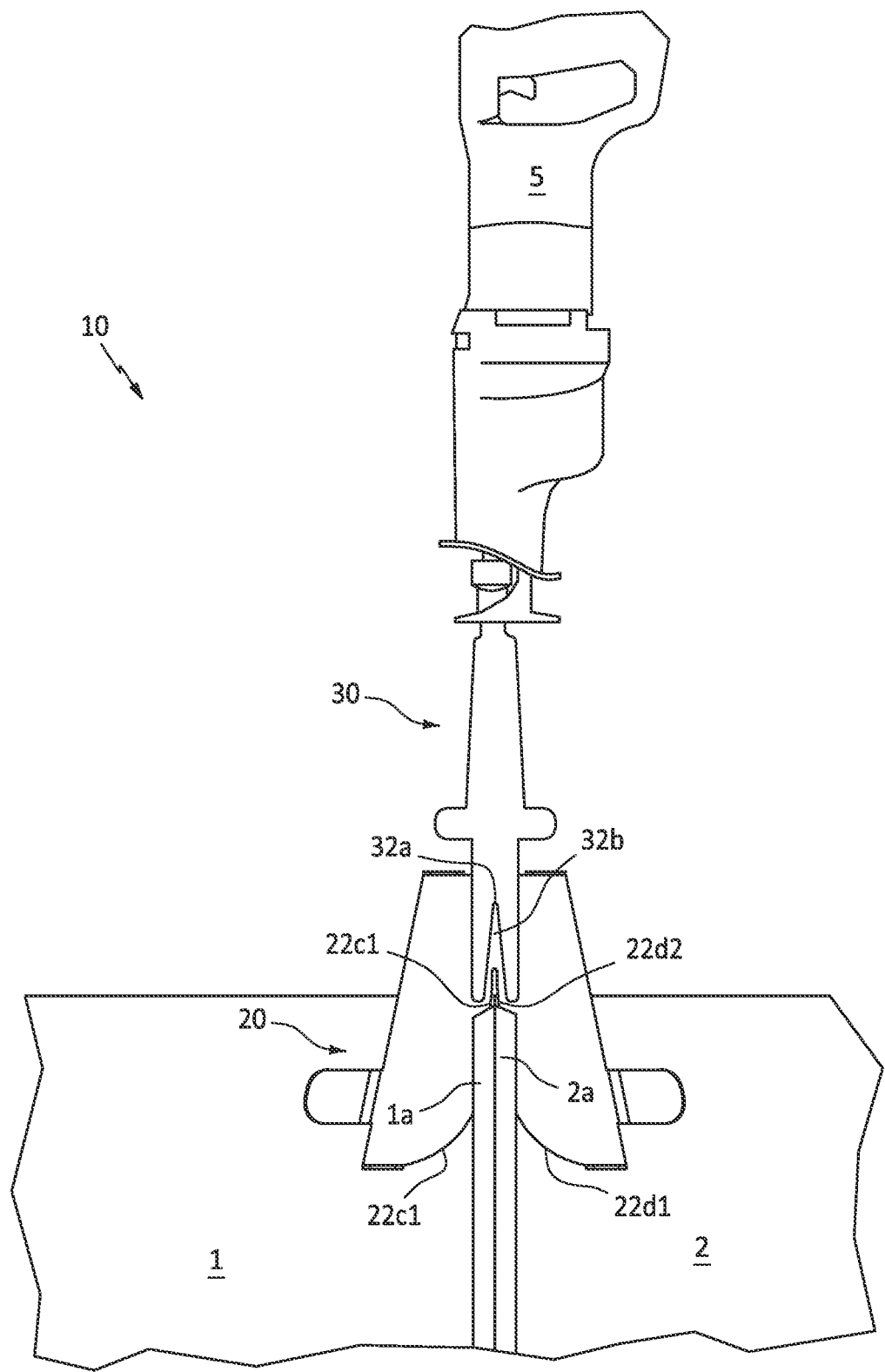
FIG. 4B is another front view of the duct alignment and securement system in operation, in accordance with one embodiment of the invention.

As shown best at FIG. 4B, the tool 30 can be installed onto a reciprocating saw 5 via the power tool engagement member, and the top ends of the flanges 1a and 2a can be positioned through the open bottom end 32b of the second alignment channel on the tool 30. Next, the saw can be activated whereby the reciprocating up and down movement of the tool can force the flanges together while moving the top end of the channel downward until the closed top end 32a makes contact with the tips of the flanges.

Figure 4C:
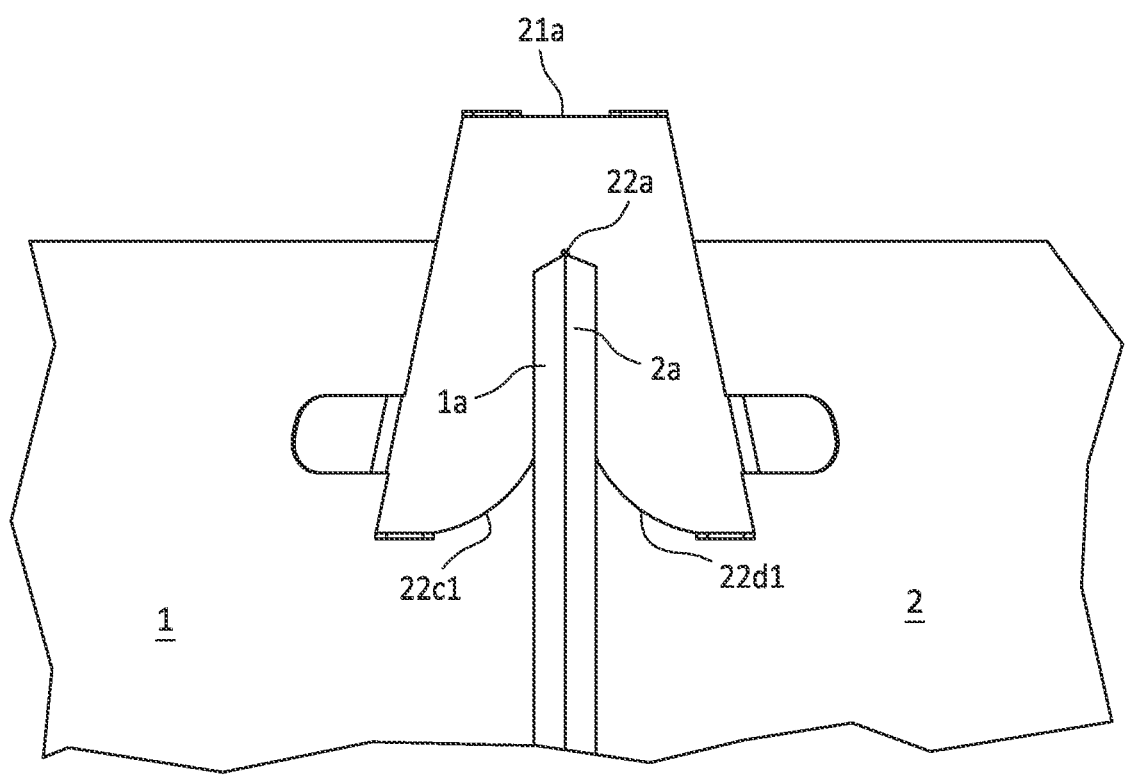
FIG. 4C is another front view of the duct alignment and securement system in operation, in accordance with one embodiment of the invention.

Because the first and second guide channels include complementary dimensions, this action will allow the guide device 20 to move all the way down until the top ends of both of the flanges are completely even and are resting against the top end of the alignment channel 22a of the guide device 20 as shown at FIG. 4C.

Figure 4D:
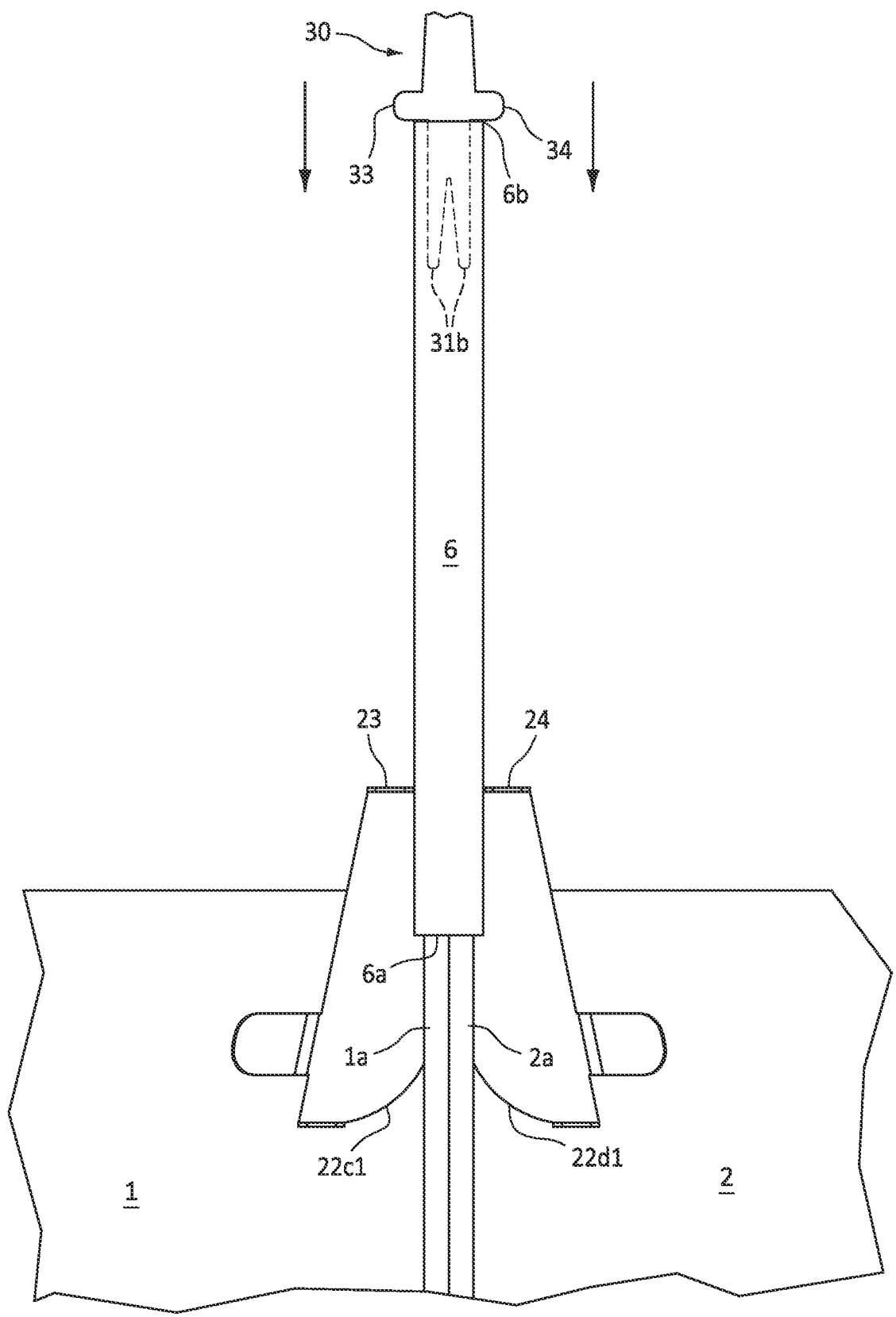
FIG. 4D is another front view of the duct alignment and securement system in operation, in accordance with one embodiment of the invention.

As shown at FIG. 4D, the user can then position the open bottom end 6a of a drive cleat 6 between the stop tabs 23-24 of the guide device and push downward until the top ends of the flanges 1a and 2a are inside the cleat opening 6a. Next, the bottom end of the tool 31b can be positioned through the open top end of the drive cleat 6b until the engagement tabs 33 and 34 make contact with the edges of the cleat.

Figure 4E:
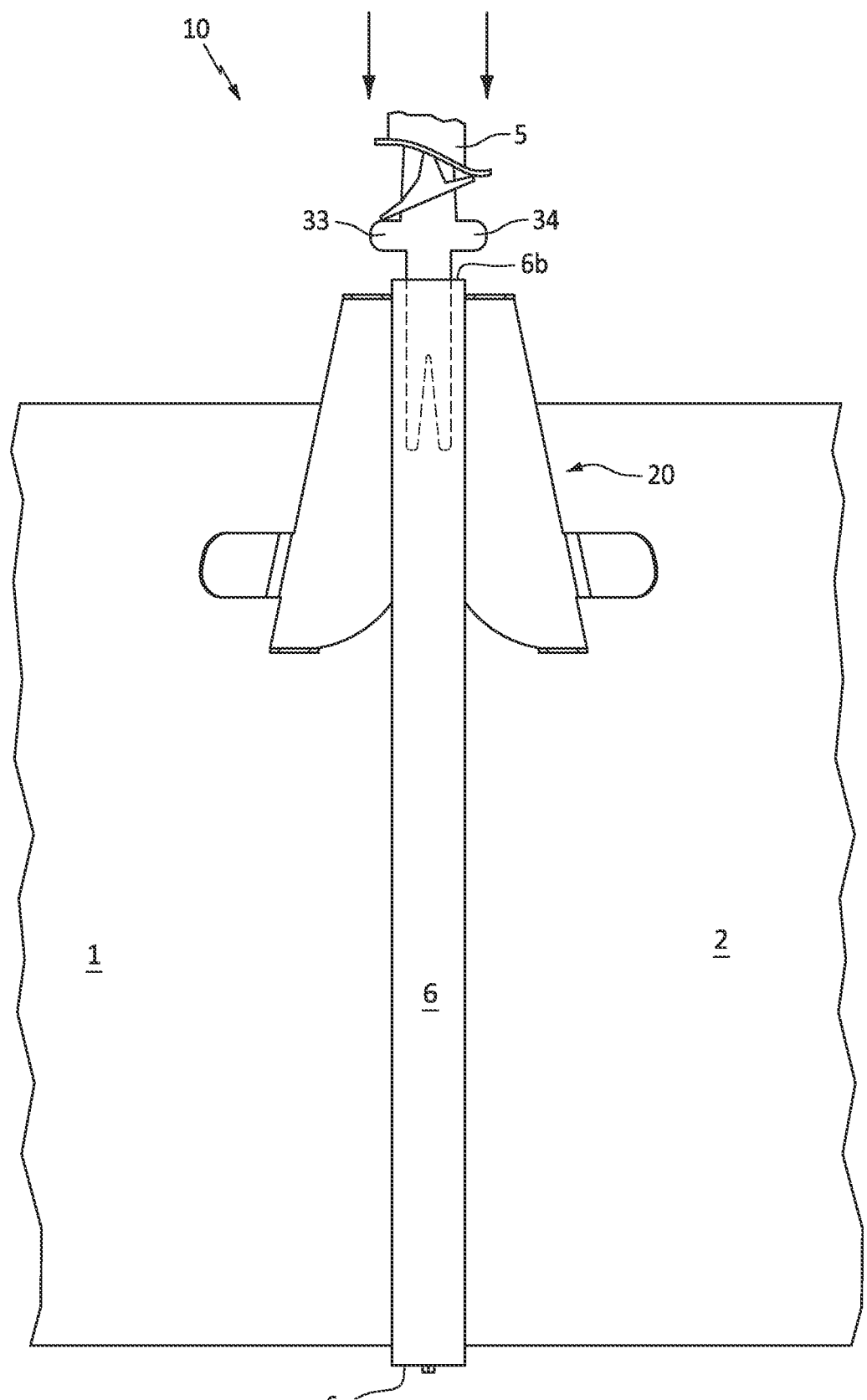
FIG. 4E is another front view of the duct alignment and securement system in operation, in accordance with one embodiment of the invention.

Finally, as shown at FIG. 4E, the user can activate the saw which will impart a reciprocating up and down linear movement on the tool 30. With each downward movement, the tabs 33 and 34 will engage the top end of the cleat 6a to essentially hammer the cleat 6 down along the length of the flanges 1a and 2a to permanently secure the components together. Upon conclusion of this step, the user can remove the guide 20 and tool 30 for storage and later use. Although not illustrated, if the guide 20 is difficult to remove manually, the user can position the top edges of the tool tabs against the bottom edges of the stop tabs and can use the upward force of the reciprocating saw to impart an upward hammer force onto the guide that will dislodge it from the ducts.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising: a flange guide main body having a top end, a bottom end, a first side and a second side; a first alignment channel that is formed along the flange guide main body, said first alignment channel including a closed top end, an open bottom end, an upper half shape, and a lower half shape; a tool main body having a top end, a bottom end, a pair of side walls; a second alignment channel that is formed along the tool main body, said second alignment channel having a closed top end, an open bottom end, wherein the flange guide main body is configured to engage and align a pair of flanges on adjacent air conditioning ducts, and wherein the tool main body is configured to engage an open top end of a drive cleat and to push the drive cleat along a length of the pair of flanges.

2. The system of claim 1, further comprising: a pair of tool stop tabs that are positioned along the top end of the flange guide main body.

3. The system of claim 2, wherein the pair of tool stop tabs protrude outward from a front surface of the flange guide main body, and include a first separation distance from each other.

4. The system of claim 3, wherein the first separation distance is greater than a width of the drive cleat.

5. The system of claim 3, wherein the tool includes a width that is less than the first separation distance, and said width is less than a width of the open top end of the drive cleat.

6. The system of claim 5, further comprising:
a pair of engagement tabs that extend outward from the pair of side walls of the tool main body.

7. The system of claim 6, wherein the pair of engagement tabs include a separation distance from each other that is greater than the first distance, and
wherein a bottom end of the pair of engagement tabs are configured to engage a pair of sides on the open top end of the drive cleat and to impart a hammer force onto the drive cleat.

8. The system of claim 1, further comprising:
a power tool engagement member that is positioned along the top end of the tool main body.

9. The system of claim 8, wherein the power tool engagement member is configured to engage a reciprocating saw.

10. A flange guide device, comprising:
a main body having a top end, a bottom end, a first side and a second side;
an alignment channel that is formed along the main body, said alignment channel including a closed top end, an open bottom end, and a pair of sides; and
a pair of tool stop tabs that are positioned along the top end of the main body,
wherein the pair of sides include a tapered orientation having a broad separation distance along the open bottom end and a narrow separation distance along the closed top end, and
wherein the alignment channel is configured to receive a pair of flanges on a pair of adjacent air conditioning ducts within the open bottom end, and to push the flanges together to receive a drive cleat as the flanges move toward the closed top end.

11. The system of claim 10, wherein the pair of tool stop tabs protrude outward from a front surface of the main body, and include a first separation distance from each other.

12. The system of claim 11, wherein the first separation distance is greater than a width of the drive cleat.

13. The system of claim 10, further comprising:
a pair of handles that extend outward from the main body.

14. The system of claim 10, further comprising:
a power tool engagement member that is positioned along the top end of the main body.

15. The system of claim 14, wherein the power tool engagement member is configured to engage a reciprocating saw.

16. A drive cleat engagement tool, comprising:
a main body having a top end, a bottom end, a pair of side walls;
an alignment channel that is formed along the main body, said alignment channel including a closed top end, an open bottom end, and a pair of sides; and
a pair of engagement tabs that extend outward from the pair of side walls of the main body,
wherein the pair of sides include a tapered orientation having a broad separation distance along the open bottom end and a narrow separation distance along the closed top end, and
wherein the alignment channel is configured to receive a pair of flanges on a pair of adjacent air conditioning ducts within the open bottom end, and to push the flanges together to receive a drive cleat as the flanges move toward the closed top end.

17. The system of claim 16, wherein the main body includes a width that is less than a width of an open top end of the drive cleat.

18. The system of claim 16, wherein the pair of engagement tabs are configured to engage a pair of sides on the open top end of the drive cleat and to impart a hammer force onto the drive cleat.

19. The system of claim 16, further comprising:
a power tool engagement member that is positioned along the top end of the main body.

20. The system of claim 19, wherein the power tool engagement member is configured to engage a reciprocating saw.

* * * * *